United States Patent
Kurabayashi et al.

(10) Patent No.: US 9,229,779 B2
(45) Date of Patent: Jan. 5, 2016

(54) PARALLELIZING HETEROGENEOUS NETWORK COMMUNICATIONS IN SMART DEVICES BASED ON SELECTION OF TASK ALLOCATION STRATEGY

(75) Inventors: Shuichi Kurabayashi, Kanagawa (JP); Naofumi Yoshida, Kanagawa (JP); Kosuke Takano, Kanagawa (JP)

(73) Assignee: Empire Technology Development LLC, Wilmington, DE (US)

( * ) Notice: Subject to any disclaimer, the term of this patent is extended or adjusted under 35 U.S.C. 154(b) by 731 days.

(21) Appl. No.: 12/647,711

(22) Filed: Dec. 28, 2009

(65) Prior Publication Data

US 2011/0161974 A1 Jun. 30, 2011

(51) Int. Cl.
*G06F 9/46* (2006.01)
*G06F 9/50* (2006.01)
*G06F 9/48* (2006.01)

(52) U.S. Cl.
CPC ............ *G06F 9/5066* (2013.01); *G06F 9/4843* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 5,303,369 A * | 4/1994 | Borcherding et al. | 718/104 |
| 7,137,119 B1 * | 11/2006 | Sankaranarayan et al. | 718/103 |
| 7,290,259 B2 * | 10/2007 | Tanaka et al. | 718/1 |
| 8,028,292 B2 * | 9/2011 | Inoue et al. | 718/105 |
| 8,565,811 B2 * | 10/2013 | Tan et al. | 455/550.1 |
| 2009/0023414 A1 * | 1/2009 | Zimmer et al. | 455/323 |
| 2009/0187915 A1 * | 7/2009 | Chew et al. | 718/104 |

OTHER PUBLICATIONS

Seo, E. et al, Dynamic Repartitioning of Real-Time Schedule on a Multicore Processor for Energy Efficiency, Lecture Notes in Computer Science, 2006, accessed via http://calab.kaist.ac.kr/~ses/euc.pdf on Dec. 24, 2009, p. 1-10, published in Korea.

Hubbard, Thomas et al, Performance Validation on Multicore Mobile Devices, Lecture Notes in Computer Science, 2008, accessed via http://vstte.ethz.ch/Files/hubbard-lencevicius-metz-raghavan.pdf on Dec. 24, 2009, p. 1-9.

Marcu, M., et al, Power efficiency study of multithreading applications for multi-core mobile systems, WSEAS Transactions on Computers, Dec. 2008, p. 1875-1885, vol. 7, Issue 12, World Scientific and Engineering Academy and Society (WSEAS), Stevens Point, Wisconsin, USA.

Darcy, J., et al., "JSR 269: Pluggable Annotation Processing API," accessed at http://web.archive.org/web/20090422231025/http://jcp.org/en/jsr/detail?id=269 , pp. 6, accessed on Jul. 10, 2012.

* cited by examiner

*Primary Examiner* — Meng An
*Assistant Examiner* — James J Lee

(57) ABSTRACT

The present disclosure relates to devices, implementations and techniques for task scheduling. Specifically, task scheduling in an electronic device that has a multi-processing environment and support network interface devices.

16 Claims, 6 Drawing Sheets

500 – A computer program product

502 – A signal bearing medium

504 – Machine-readable instructions, which if executed by one or more processors, may operatively enable a computing device to:
   select an allocation strategy for a task, based on an attribution of the task; and
   allocate the task to one or more processor cores, based at least in part on the selected allocation strategy.

506 – A computer – readable medium

508 – A recordable medium

510 – A communications medium

FIG. 5

PARALLELIZING HETEROGENEOUS NETWORK COMMUNICATIONS IN SMART DEVICES BASED ON SELECTION OF TASK ALLOCATION STRATEGY

BACKGROUND

Unless otherwise indicated herein, the approaches described in this section are not prior art to the claims in this application and are not admitted to be prior art by inclusion in this section.

Parallel computing is a typical solution to improve efficiency of multiple computing processes. The easiest type of parallel computing is the bag-of-tasks parallelization that allows computing nodes to share a list of target processes and to pick them one by one from the list, until the list is exhausted. However, such simple parallelization can't exploit the full capacity of core architecture of modern central processing units (hereinafter "CPU") and heterogeneous network interface devices. As the utilization of multi-core CPU chips, multi-core GPU (Graphical Processing Unit) chips, multi-core CPU architecture embedded devices, and the like, are continually increased, the need for techniques to effectively utilizing these chips increases.

Modern smart devices, such as smart phones, support multiple and heterogeneous network interface devices supporting protocols such as 3G, LTE, GSM, Bluetooth, ZigBee, UWB, IrDA, and Wireless-USB, as will be understood to those skilled in the art.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 illustrates an exemplary computing device, according to one embodiment of the present disclosure.

DETAILED DESCRIPTION

Figure 1:
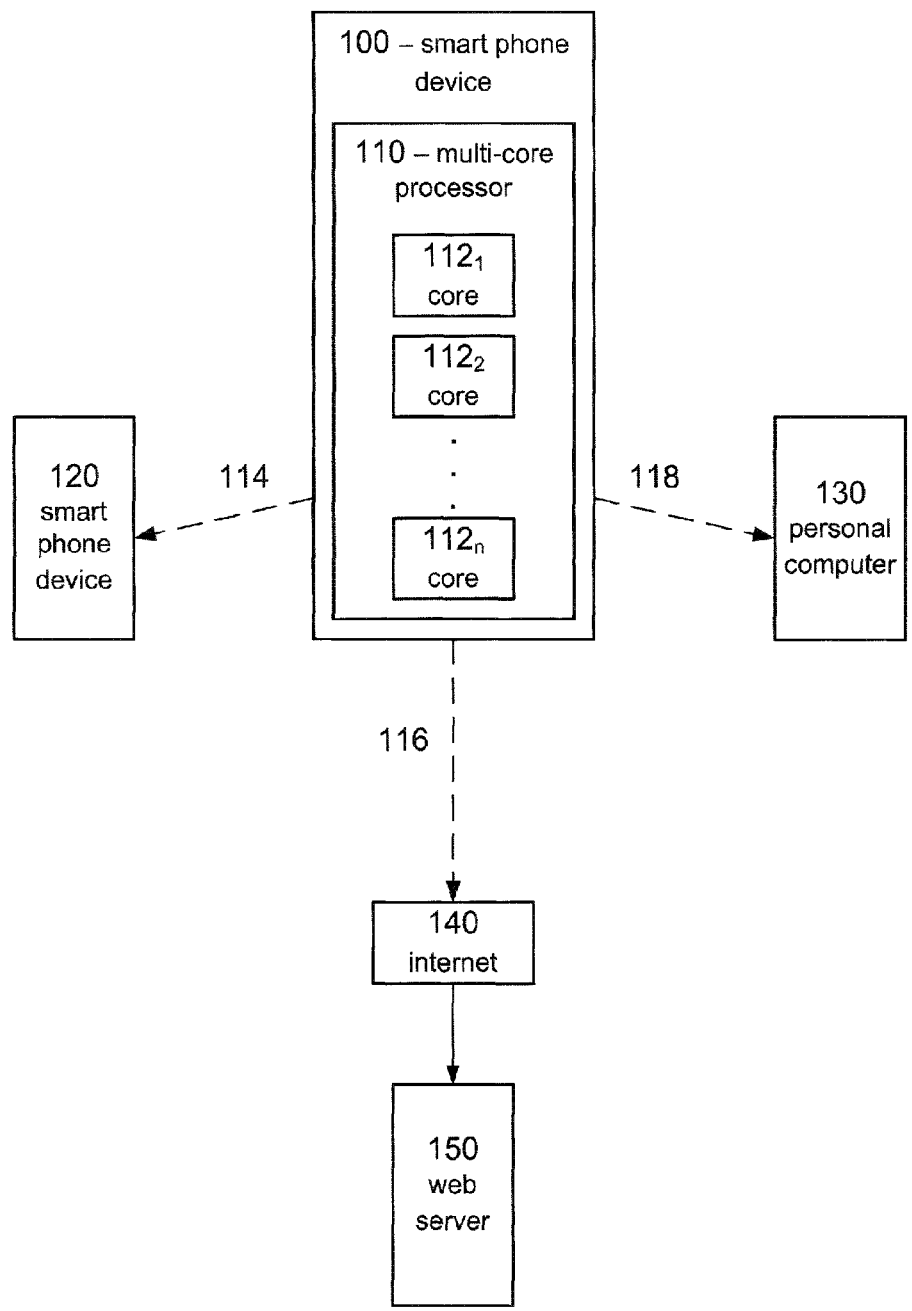
FIG. 1 illustrates a smart phone device parallelizing heterogeneous network communication, according to one embodiment of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

It is understood that the term "multiple processor cores" may include, but is not limited to: i) a single processor including multiple cores (e.g. multi-core processor), and ii) multiple processors, each of which includes a single core and/or multiple cores.

This disclosure is drawn, inter alia, to methods, apparatus, systems and/or computer program products related to task scheduling. Specifically, this disclosure is drawn to task scheduling in an electronic device that has a multi-processing environment and support for multiple network interface devices.

Many smart phone devices, mobile data devices, and the like, support multiple and heterogeneous network interface devices supporting protocols such as 3G ($3^{rd}$ Generation mobile telecommunications standard), LTE (Long Term Evolution), GSM (Global System for Mobile communications), Bluetooth (open wireless protocol for exchanging data over short distance), ZigBee (high level communication protocols using small, low-power digital radios), UWB (Ultra-Wideband radio technology that can be used at very low energy levels for short-range high-bandwidth communications), IrDA (Infrared Data Association—communication protocol standards for short-range exchange of data over infrared light), and Wireless-USB (Universal Serial Bus (wired communication)), and the like. Also, some smart phone devices and the like have a multi-processing environment such as multiple processors or multi-cores.

It is understood that, although the detailed description may use the term "smart phone" as an exemplary electronic device to which the subject matter applies, the subject matter of the present disclosure many apply to any electronic device having multiple processor cores and supporting multiple and heterogeneous network interface devices.

An embodiment of the subject matter described herein provides a task scheduling device, method, and article which may be used for a smart phone device and the like which has multi-processing environment and supports multiple network interface devices. Such task scheduling device, method, and article can realize parallelized network communication in a smart phone device or the like by adaptively configuring the task scheduling parameters for multiple processor cores. More specifically, the subject task scheduling device, method, and article can perform network communication using heterogeneous network interface devices simultaneously by configuring the task scheduling parameters adaptively according to each network interface device's own physical and logical attribution or characteristics. An embodiment for present disclosure may include controlling task scheduling weighting for exploiting multi-core processors by morphing the parameters adaptively.

FIG. 1 shows a schematic of a smart phone device parallelizing heterogeneous network communications in accordance with at least some embodiments of the present disclosure. A smart phone device 100 may have a multi-core processor 110. In one example, the multi-core processor 110 includes multiple cores, labeled as $112_1$, $112_2$, ... $112_n$, where n is the total number of cores. The smart phone device 100 may have several network interface devices, such as 3G, LTE, WiMAX, GSM, Bluetooth, ZigBee, UWB, IrDA, Wireless-USB, and the like, as well as a TCP/IP protocol stack. The smart phone device 100 may be in voice communication (shown as element 114) with another smart phone device 120 by using 3G, LTE, WiMAX or the like. The smart phone device 100 may also be in personal area network (PAN) communication 118 with a personal computer 130 by using Bluetooth, UWB, ZigBee or the like. Additionally, the smart phone device 100 may be in TCP/IP communication 116 with a web server 150 via the Internet 140. Furthermore, several application programs such as a music player, a web browser and the like may be run on the smart phone device 100.

In accordance with at least some embodiments of the present disclosure, a task scheduling device may be operatively coupled to a device having multiple processor cores and supporting multiple network interface devices comprises a task analyzer unit configured to select an allocation strategy for a task, based on an attribution of the task; and a task allocator unit may be configured to allocate the task to one or more processor cores, based at least in part on the selected allocation strategy. The task analyzer unit may be configured to select the allocation strategy for the task, based at least in part on the attribution of the task with regard to a network interface device.

Figure 2:
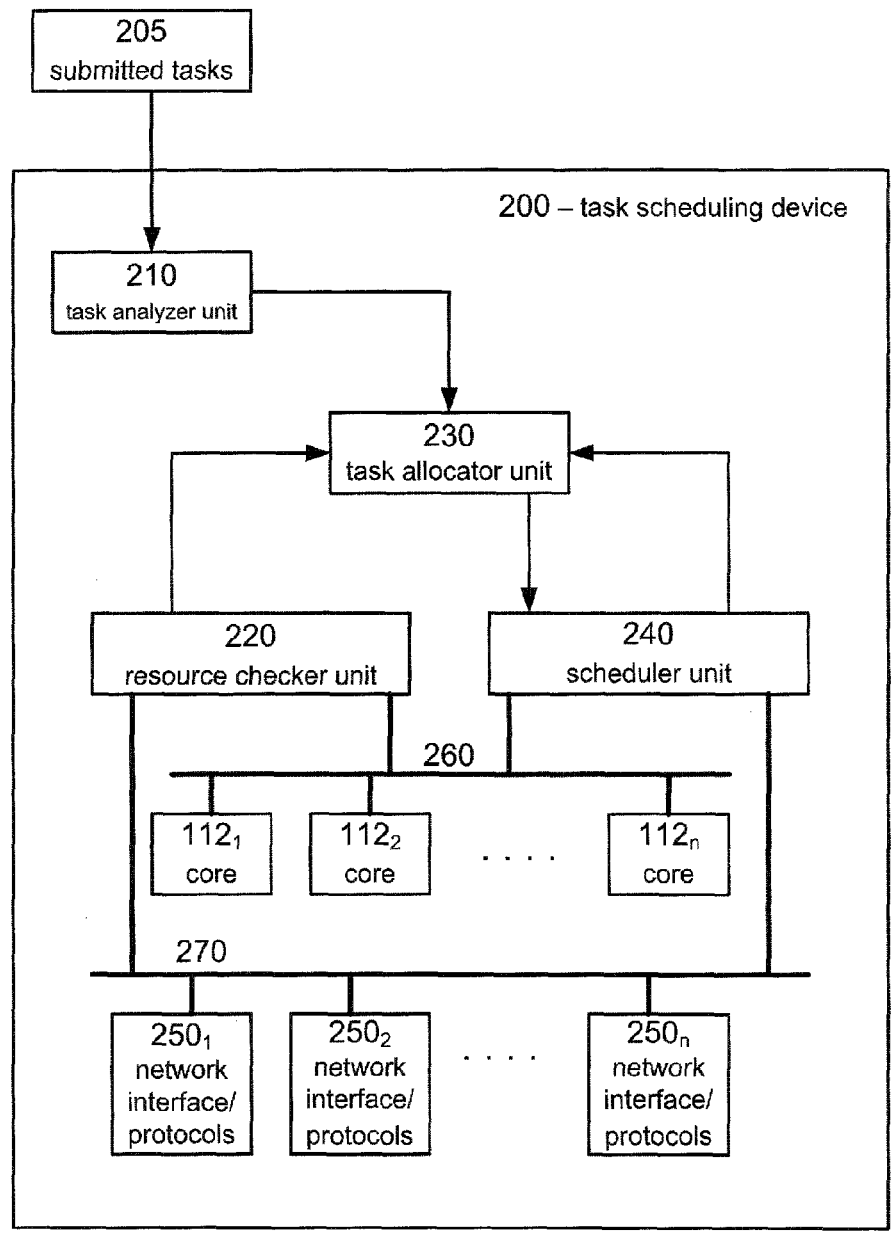
FIG. 2 illustrates a task scheduling device, according to one embodiment of the present disclosure.

FIG. 2 shows a schematic of a task scheduling device 200 which may be used in a smart phone device 100 of FIG. 1. The task scheduling device 200 may include a task analyzer unit 210, a task allocator unit 230, a resource checker unit 220, and a scheduler unit 240.

The task analyzer unit 210 may be configured to receive one or more submitted tasks (shown as element 205). The task analyzer unit 210 may then analyze network interfaces and protocols $250_1$, ... $250_n$, which will be used by the submitted tasks. Furthermore, the task analyzer unit 210 may create a list of sub-tasks for each task.

The task analyzer unit 210 may be configured to retrieve attributions of a task, such as network interfaces and protocols to be used, latency, data size to communicate, CPU usage, level of parallelism and the like, from a program file which is operatively associated with the task. The program file may be configured to include annotations, which indicate the network interfaces and protocols to be used by the task.

An example of such annotations in accordance with at least some embodiments of the present disclosure is as follows:

```
@NetworkInterface ("3G")
@CommunicationProtocol("HTTP")
public class CommunicationTaskClass {
    doSomeThing ( ) {
        ............
    }
}
```

The annotations may be implemented by using programming languages' metadata system, such as Java Annotation (see JSR-269: Pluggable Annotation Processing API available at "http colon forward slash forward slash jcp dot org forward slash en forward slash jsr forward slash detail?id=269") and the like. The above example annotation is exemplary for a communication task in Java. This example shows two annotations—i.e. "@NetworkInterface" and "@CommunicationProtocol". "@NetworkInterface" is an annotation for specifying physical network interface. "@CommunicationProtocol" is an annotation for specifying application-level communication protocol such as HTTP (HyperText Transfer Protocol), SMTP (Simple Mail Transfer Protocol), IMAP (Internet Message Access Protocol) over TCP/IP, A2DP (Advanced Audio Distribution Profile) over Bluetooth and the like.

The task analyzer unit 210 may be configured to select an allocation strategy for the task, based on an attribution of the task. The allocation strategy indicates how to allocate a task to processor cores. For example, the allocation strategy may include i) One-to-One, ii) One-to-Many, iii) Many-to-One, and iv) Many-to-Many.

The strategy "One-to-One" is to allocate a single task to the single processor core. The single task will occupy the allocated core. This strategy may be effective, for example, to perform a task that has low-level parallelism.

The strategy "One-to-Many" is to allocate a single task to multiple processor cores to execute it simultaneously. This strategy may be effective, for example, to perform a task that has high-level parallelism. An example of this strategy, may include, but is not limited to rendering a web page, which may include an HTML ("Hyper Text Markup Language"—i.e., the core program) file, a JPG ("Joint Photographic experts Group"—i.e., photos and graphics) file, a MIDI ("Musical Instrument Digital Interface"—i.e., music) file, and the like.

The strategy "Many-to-One" is to allocate multiple tasks to a single processor core. This strategy may be a conventional CPU scheduling strategy of multi-tasking OS ("Operating System") such as Microsoft Windows, Linux, and the like. This strategy may be, for example, effective to perform multiple tasks that involve network communication with large latency.

The strategy "Many-to-Many" is to allocate multiple tasks to multiple processor cores to execute them simultaneously. This strategy should be effective to perform multiple tasks that have high-level parallelism and involve network communications with large latency.

The task analyzer unit 210 may be configured to select an allocation strategy among the strategies above for the task, based on an attribution of the task.

An example of an attribution of a task is a network interface device for the use of the task. The network communication may be classified into four types of categories, as follows.

Voice communication—This category of communication uses a common cellular phone protocol, such as GSM, 3G, LTE, and the like. This category may include VoIP communication using TCP/IP. This category of communication may need real-time and low-latency data link between nodes in order to provide real-time voice communication. Thus, the allocation strategy "One-to-One" may be appropriate for this category of communication.

Personal area communication—This category of communication is dedicated for local area and "device-to-device" communication, such as Bluetooth, UWB, and the like. This category may need high-level parallelism because a smart phone needs to receive a phone call even if the smart phone is performing a personal area communication. Thus, the allocation strategy "Many-to-Many" may be appropriate for this category of communication.

TCP/IP Communication—This category of communication may include common web browsing and e-mailing tasks. As web browsers and e-mail clients may have a significant number of independent tasks, these applications may have high-level parallelism. For example, rendering HTML documents generally involves multiple HTTP "GET" command executions for retrieving image files. These HTTP "GET" commands can be performed in parallel because those commands are independent of each other. Thus, the allocation strategy "One-to-Many" may be appropriate for this category of communication.

Application programs—This category is for installed applications on a smart phone device. The smart phone device may have network-enabled applications, such as a music player, VoIP clients, a FTP client, and the like. As applications use various protocols, it is difficult to estimate the network latency and the communication data size statically. Thus, the allocation strategy may be determined, based on other attributions of the task, such as CPU usage, parallelism of those applications, the like or combinations thereof.

Table 1 shows an example of storing attributions of the task and the associated allocation strategy in accordance with at least some embodiments of the present disclosure. The task analyzer unit 210 may be configured to select an allocation strategy for a task, based on one of or any combination of the attributions of the task regarding latency, data size, CPU usage, and parallelism, by referring to such a table.

TABLE 1

| Latency | Data Size | CPU Usage | Parallelism | Allocation Strategy |
| --- | --- | --- | --- | --- |
| Low | Small | Low | Low | One-to-One |
| Low | Small | Low | High | Many-to-Many |
| High | Large | Low | High | Many-to-Many |
| High | Large | High | High | One-to-Many |
| High | Small | Low | High | Many-to-Many |
| N/A | N/A | High | High | One-to-Many |
| N/A | N/A | Low | High | Many-to-Many |
| N/A | N/A | Low | Low | Many-to-One |
| N/A | N/A | High | Low | One-to-One |

Referring back to FIG. 2, the resource checker unit 220 may be configured to monitor usage of each CPU (shown as elements $112_1$, $112_2$, ... $112_n$) through a communication device 260 (e.g. a bus) and available bandwidth of each network interface (shown as elements $250_1$, $250_2$, ... $250_n$) through a communication device 270 (e.g. a bus). The result of availability/capacity monitoring is reported to a task allocator unit 230, which is explained in detail below.

The task allocator unit 230 may be configured to allocate one or more tasks to one or more processor cores, based at least in part on the allocation strategy selected by the task analyzer unit 210. The task allocator unit 230 also may be configured to prepare threads and/or processes for executing tasks based on the allocation strategy. The task allocator unit 230 may prepare the threads for executing a single task by using multi-core processors. The task allocator unit 230 may also prepare the processes for executing multiple independent tasks by using multi-core processors.

Furthermore, the task allocator unit 230 may be configured to receive the information regarding usage of each CPU and available bandwidth of each network interface from the resource checker unit 220. Then, the task allocator unit 230 may be configured to re-allocate the tasks to threads/processes based on the availability/capacity of network interface devices and CPU cores.

The scheduler unit 240 may be configured to control execution of multiple threads or processes. The scheduler unit 240 may assign sub-tasks to each core (shown as $112_1$, $112_2$, ... $112_n$) and may be in communication with each network interface (shown as elements $250_1$, $250_2$, ... $250_n$) through a communication device 270 (e.g. a bus).

Thus, the present disclosure may achieve parallelized network communication in smart devices by adaptively configuring the task scheduling parameters for multi-core processors. The present disclosure may achieve network communication using heterogeneous network interface devices simultaneously by configuring the task scheduling parameters adaptively according to each network interface device's own physical and logical characteristics. The present disclosure may be used with smart devices having multiple CPU or multi-core CPU and having support for network communication protocols such as TCP/IP (Transmission Control Protocol/Internet Protocol) over 3G, voice over 3G, LTE, GSM, Bluetooth, ZigBee, UWB, IrDA, and Wireless-USB, and the like, wherein the present disclosure assigns processor cores to the communication tasks that use a specific network interface.

Figure 3:
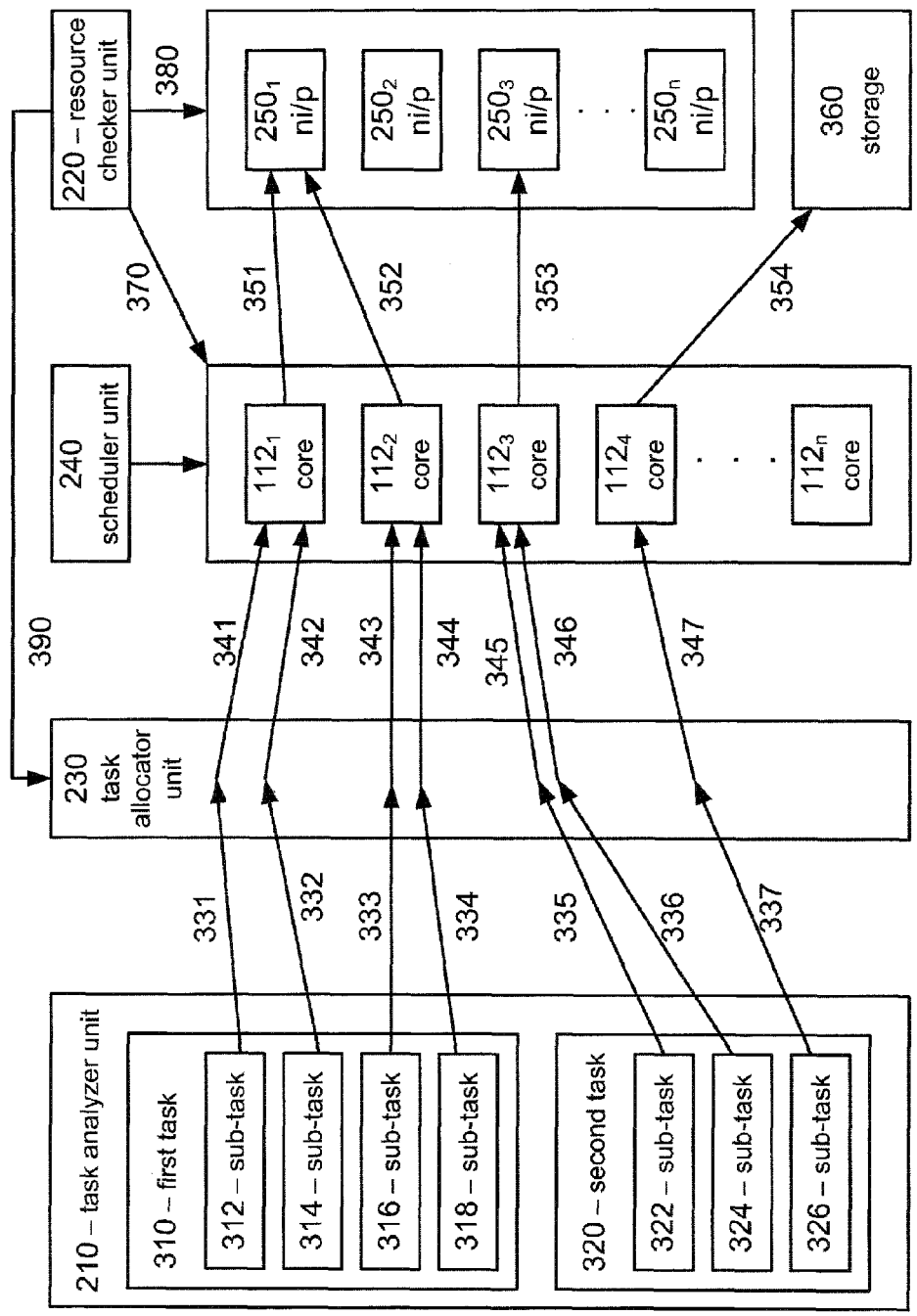
FIG. 3 illustrates a process flow, according to one embodiment of the present disclosure.

FIG. 3 shows an example of a task allocation and execution in the task scheduling device 200 which may be used in a smart phone device 100 in accordance with at least some embodiments of the present disclosure.

In this example, the task analyzer unit 210 accepts two tasks. The first task 310 may be a web browser that renders http://www.uspto.gov/index.htm, and the second task 320 may be an address book application that exchanges address information with other devices by using an IrDA protocol. When the task scheduling device 200 accepts these two tasks, the task analyzer unit 210 retrieves the annotations defined in the corresponding program files, as will be understood to those skilled in the art. The task analyzer unit 210 may create a list of sub-tasks 312, 314, 316, and 318 for first task 310. For example, first sub-task 312 may be a "GET index.htm" instruction, second sub-task 314 may be a "GET head.png" instruction, third sub-task 316 may be a "GET foot.png" instruction, and forth sub-task 318 may be a "GET main.png" instruction. The task analyzer unit 210 may also create a list of sub-tasks 322, 324, and 326 for second task 320. For example, first sub-task 322 may be a "Send an address" instruction, second sub-task 324 may be a "Receive an address" instruction, and third sub-task 326 may be a "Store the address" instruction.

The task analyzer unit 210 may also retrieve four annotations (Latency, Data Size, CPU Usage, Parallelism) from the corresponding program files. The task analyzer unit 210 selects the appropriate task allocation strategy ("One-to-One", "One-to-Many", "Many-to-One", "Many-to-Many") according to the parameters (Latency, Data Size, CPU Usage, Parallelism) by reflecting the parameter table shown in Table 1. The sub-tasks 312, 314, 316, 318, 322, 324, and 326 may be transferred to the task allocator unit 230 (shown as lines 331, 332, 333, 334, 335, 336, and 337) and the task allocator unit 230 may assign CPU cores (i.e. elements $112_1$, ... $112_n$) for each sub-task according to the task allocation strategy that is selected for each task (shown as lines 341, 342, 343, 344, 345, 346, and 347). The scheduler unit 240 may execute sub-tasks assigned to each CPU core and transfer the executed tasks to the appropriate network interface $250_1$, ... $250_n$ (labeled "ni/p") or to storage 360, as shown with lines 351, 352, 353, and 354. The resource checker unit 220 monitors the status of CPU usage (shown as line 370) and the available bandwidth of network interfaces continuously (shown as line 380). The resource checker unit 220 notifies the task allocator unit 230 about the availability and capacity of CPUs and network interfaces (shown as line 390). The task allocator unit 230 may change the task allocation strategy adaptively according to the notified state of CPUs and network interfaces.

Figure 4:
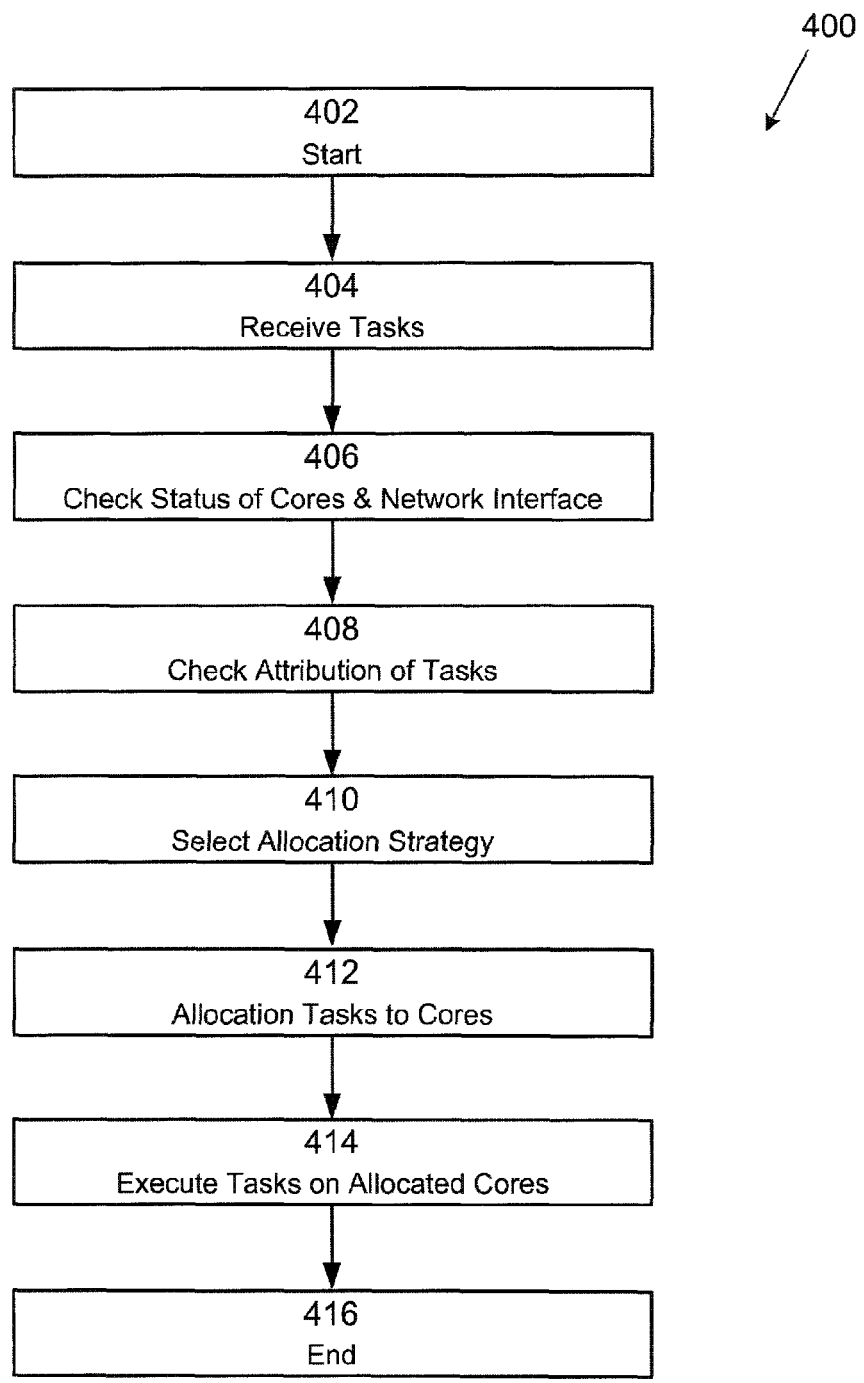
FIG. 4 illustrates an example computer program product that is arranged in accordance with the present disclosure.

FIG. 4 shows an example of a process flow for task scheduling, in accordance with at least some embodiments of the present disclosure. A process 400, and other processes described herein, set forth various functional blocks or actions that may be described as processing steps, functional operations, events and/or acts, etc., which may be performed by hardware, software, and/or firmware. Those skilled in the art, in light of the present disclosure, will recognize that numerous alternatives to the functional blocks shown in FIG. 4 may be practiced in various implementations. For example, although the process 400, as shown in FIG. 4, comprises one particular order of blocks or actions, the order in which these blocks or actions are presented does not necessarily limit claimed subject matter to any particular order. Likewise, intervening actions not shown in FIG. 4 and/or additional actions not shown in FIG. 4 may be employed and/or some of the actions shown in FIG. 4 may be eliminated, without departing from the scope of claimed subject matter. Thus, the process 400 may include one or more of operation blocks 404, 406, 408, 410, 412, and/or 414.

As illustrated in FIG. 4, the process 400 may be implemented for task scheduling for a smart phone device 100 having multiple processor cores $112_n$ and supporting multiple network interface devices 250. The process 400 may begin at start block 402 and proceeds to block 404 where the task analyzer unit 210 may receive several submitted network communication tasks. At block 406, the resource checker unit 220 may check the number of available processor cores and available processing capacity of those processor cores. The resource checker unit 220 may also check the availability of the network interface devices. For example, the resource checker unit 220 may check 3G signal and connections to wireless personal area network (WPAN) which is created with local area wireless network technologies, such as IrDA, Bluetooth, UWB, Z-Wave, ZigBee and the like.

At block 408, the task analyzer unit 210 may analyze the attributions of each task, such as network interfaces and protocols to be used. The task analyzer unit 210 may be configured to retrieve annotations, which explain the attributions of the task. Such annotations may be stored in a program file operatively associated with the task. Then, at block 410, the task analyzer unit 210 may determine an allocation strategy for the task, by referencing a parameter table, such as shown in Table 1.

At block 412, the task allocator unit 230 may allocate each task to the corresponding core, based on the allocation strategy determined by the task analyzer unit 210. At block 414, the task allocator unit 230 may assign the task scheduling parameters, and the scheduler unit 240 may control execution of the tasks on each processor core. The process may then end at block 416.

FIG. 5 illustrates an example computer program product 500 that is arranged in accordance with the present disclosure. Program product 500 may include a signal bearing medium 502. Signal bearing medium 502 may include one or more machine-readable instructions 504, which, if executed by one or more processors, may operatively enable a computing device to provide the functionality described above with respect to FIG. 4; in specific, select an allocation strategy for a task, based on an attribution of the task, and allocate the task to one or more processor cores, based at least in part on the selection allocation strategy. Thus, for example, referring to FIG. 2, a task scheduling device 200 may undertake one or more of the actions shown in FIG. 4 in response to instructions 504 conveyed by medium 502.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.).

Figure 6:
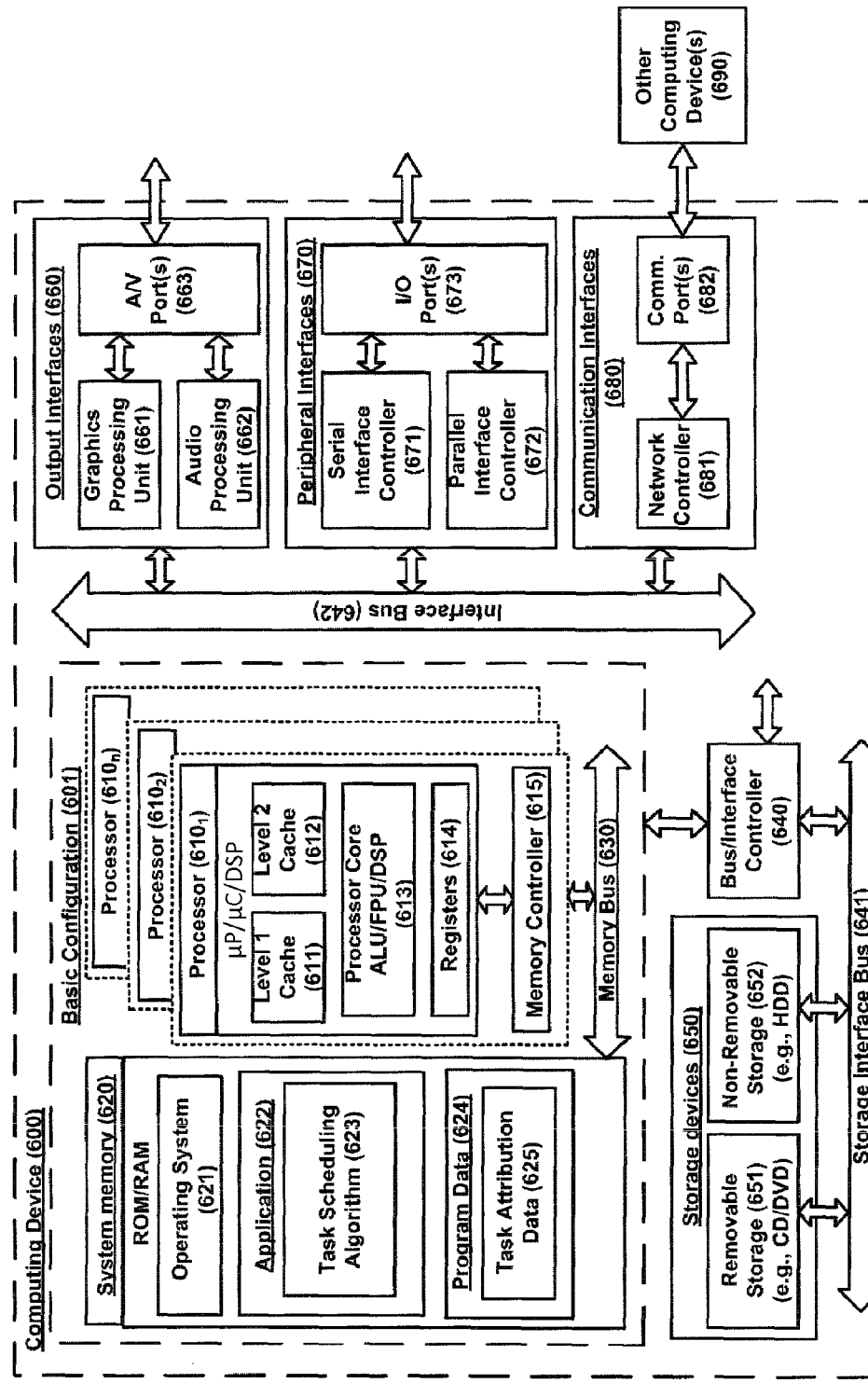
FIG. 6 illustrates an exemplary computing device, according to one embodiment of the present disclosure.

FIG. 6 is a block diagram illustrating an exemplary computing device 600 that is arranged in accordance with the present disclosure. In one example configuration 601, computing device 600 may include one or more processors (shown as multiple processors $610_1$, $610_2$, ... $610_n$) and system memory 620. A memory bus 630 can be used for communicating between the processors $610_1$, $610_2$, ... $610_n$ and the system memory 620.

Depending on the desired configuration, processors $610_1$, $610_2$, ... $610_n$ may be of any type including but not limited to a microprocessor (μP), a microcontroller (μC), a digital signal processor (DSP), or any combination thereof. Processors $610_1$, $610_2$, ... $610_n$ can include one or more levels of caching, such as a level one (L1) cache 611 and a level two (L2) cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processors $610_1$, $610_2$, ... $610_n$, or in some implementations the memory controller 615 can be an internal part of the processors $610_1$, $610_2$, ... $610_n$.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include task scheduling algorithm 623 in a task scheduling device 200 (FIG. 2) that is arranged to perform the functions and/or operations as described herein including the functional blocks and/or operations described with respect to process 400 of FIG. 4. Program data 624 may include task attribution data 625 for use in the task scheduling algorithm 623. In some example embodiments, application 622 may be arranged to operate with program data 624 on an operating system 621 such that implementations of mobile sampling may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more NV ports 663. Example peripheral interfaces 670 may include a serial interface controller 671 and/or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 690 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A device, comprising:
   multiple processor cores;
   a resource checker unit configured to determine a status of the multiple processor cores and of multiple heterogeneous network interface devices;
   a task analyzer unit configured to:
      receive a communication task to be performed by the device;
      divide the communication task into two or more subtasks;
      determine communication attributions of the two or more subtasks, the communication attributions comprising a network interface to be used, a data size to communicate, and a level of parallelism; and
      in response to the received communication task, select an allocation strategy for the communication task based at least in part on the status of the multiple processor cores and of multiple heterogeneous network interface devices and a combination of at least the data size, and the level of parallelism, such that:
         a one-to-one allocation strategy is selected for a small data size and a low level of parallelism,
         a one-to-many allocation strategy is selected for a large data size and a high level of parallelism,
         a many-to-one allocation strategy is selected for a large data size and a low level of parallelism, and
         a many-to-many allocation strategy is selected for a small data size and a high level of parallelism; and
   a task allocator unit configured to allocate the two or more subtasks to one or more processor cores of the multiple processor cores based at least in part on the selected allocation strategy,
   wherein the device is configured to:
      execute the two or more subtasks on the one or more processor cores; and
      transfer an output of the two or more subtasks to a network interface device of the multiple heterogeneous network interface devices based on the network interface to be used.

2. The device of claim 1, wherein the task analyzer unit is further configured to retrieve the communication attributions of the two or more subtasks from a program file that is operatively associated with the communication task.

3. The device of claim 1, wherein the one-to-one allocation strategy comprises an allocation of a single subtask of the two or more subtasks to a single processor core.

4. The device of claim 1, wherein the one-to-many allocation strategy comprises an allocation of a single subtask of the two or more subtasks to multiple processor cores.

5. The device of claim 1, wherein the many-to-one allocation strategy comprises an allocation of multiple subtasks of the two or more subtasks to a single processor core.

6. The device of claim 1 wherein the many-to-many allocation strategy comprises an allocation of multiple subtasks of the two or more subtasks to multiple processor cores.

7. The device of claim 1, wherein the task allocator unit is further configured to prepare a thread or a process to execute the two or more subtasks on the one or more of the processor cores.

8. The device of claim 7, further comprising a scheduler unit configured to control execution of the thread or the process.

9. A task scheduling method for a device that includes multiple processor cores and that supports multiple heterogeneous network interface devices, the method comprising:
   determining a status of the multiple processor cores and the multiple heterogeneous network interface devices;
   receiving a communication task to be performed by the device;
   dividing the communication task into two or more subtasks;
   determining communication attributions of the two or more subtasks, the communication attributions comprising a network interface to be used, a data size to communicate, and a level of parallelism;
      selecting an allocation strategy for the communication task based at least in part on the status of the multiple processor cores and of multiple heterogeneous network interface devices and a combination of at least the data size and the level of parallelism, such that:
         a one-to-one allocation strategy is selected for a small data size and a low level of parallelism,
         a one-to-many allocation strategy is selected for a large data size and a high level of parallelism,
         a many-to-one allocation strategy is selected for a large data size and a low level of parallelism, and
         a many-to-many allocation strategy is selected for a small data size and a high level of parallelism;
   allocating, based at least in part on the selected allocation strategy, the two or more subtasks to one or more processor cores of the multiple processor cores;
   executing the two or more subtasks on the one or more processor cores; and
   transferring an output of the two or more subtasks to a network interface device of the multiple heterogeneous network interface devices based on the network interface to be used.

10. The task scheduling method of claim 9, wherein selecting the allocation strategy for the communication task comprises retrieving the communications attributions of the two or more subtasks from a program file that is operatively associated with the communication task.

11. The task scheduling method of claim 9, wherein selecting the allocation strategy for the communication task comprises referring to a table that stores a plurality of communication attributions of the two or more subtasks and one or more allocation strategies.

12. An article of manufacture, comprising:
   a non-transitory computer storage medium comprising machine-readable instructions stored thereon, which, in response to execution by one or more processors, enable a device that includes multiple processor cores and that supports multiple heterogeneous network interface devices to:
      receive a first communication task to be performed by the device;
      divide the first communication task into a first set of subtasks;
      determine first communication attributions of the a first set of subtasks, the first communication attributions comprising a first network interface to be used, a first data size to communicate, and a first level of parallelism;
      determine a first status of the multiple processor cores and the multiple heterogeneous network interface devices;
      select a first allocation strategy for the first communication task based at least in part on the first status of the multiple processor cores and of multiple heterogeneous network interface devices and a combination of at least the first data size and the first level of parallelism, such that:
  a one-to-one allocation strategy is selected for a small data size and a low level of parallelism,
  a one-to-many allocation strategy is selected for a large data size and a high level of parallelism,
  a many-to-one allocation strategy is selected for a large data size and a low level of parallelism, and
  a many-to-many allocation strategy is selected for a small data size and a high level of parallelism;
allocate, based at least in part on the selected first allocation strategy, the first set of subtasks to one or more processor cores of the multiple processor cores;
execute the first set of subtasks on the one or more processor cores; and
transfer an output of the first set of subtasks to a network interface device of the multiple heterogeneous network interface devices based on the first network interface to be used.

13. The article of manufacture of claim 12, wherein the non-transitory computer storage medium further comprises machine-readable instructions stored thereon, which, in response to execution by the one or more processors, enable the device to:
receive a second communication task to be performed by the device;
divide the second communication task into a second set of subtasks;
determine second communication attributions of the a second set of subtasks, the second communication attributions comprising a second network interface to be used, a second data size to communicate, and a second level of parallelism;
determine a second status of the multiple processor cores and the multiple heterogeneous network interface devices;
select a second allocation strategy for the second communication task based at least in part on a combination of the second status of the multiple processor cores and of multiple heterogeneous network interface devices and at least the second data size and the second level of parallelism, such that:
  a one-to-one allocation strategy is selected for a small data size and a low level of parallelism,
  a one-to-many allocation strategy is selected for a large data size and a high level of parallelism,
  a many-to-one allocation strategy is selected for a large data size and a low level of parallelism, and
  a many-to-many allocation strategy is selected for a small data size and a high level of parallelism;
allocate the second set of subtasks to one or more processor cores of the multiple processor cores based at least in part on the second allocation strategy; and
provide a first communication associated with the first set of subtasks and a second communication associated with the second set of subtasks in parallel over different network interface devices of the multiple heterogeneous network interface devices.

14. The article of manufacture of claim 13, wherein the first communication attributions of the first set of subtasks specify a first network interface device and first protocol to be used for the first set of subtasks and the second communication attributions of the second set of subtasks specifies a second network interface device and second protocol to be used for the second set of subtasks.

15. A system, comprising:
a device that includes multiple processor cores and that supports multiple heterogeneous network interface devices;
a task scheduler device communicatively coupled to the device, the task scheduler device comprising:
  a resource checker unit configured to determine a status of the multiple processor cores and of the multiple heterogeneous network interface devices;
  a task analyzer unit configured to:
    receive a communication task to be performed by the device;
    divide the communication task into two or more subtasks;
    determine communication attributions of the two or more subtasks of the communication task, the communication attributions comprising a network interface to be used, a data size to communicate, and a level of parallelism;
    select an allocation strategy for the communication task based at least in part on the status of the multiple processor cores and of multiple heterogeneous network interface devices and a combination of at least the data size and the level of parallelism, such that:
      a one-to-one allocation strategy is selected for a small data size and a low level of parallelism,
      a one-to-many allocation strategy is selected for a large data size and a high level of parallelism,
      a many-to-one allocation strategy is selected for a large data size and a low level of parallelism, and
      a many-to-many allocation strategy is selected for a small data size and a high level of parallelism;
  a task allocator unit, operatively coupled to the task analyzer unit and to the resource checker unit, configured to allocate the two or more subtasks to one or more processor cores of the multiple processor cores based at least in part on the selected allocation strategy;
wherein the device is configured to:
  execute the two or more subtasks on the one or more processor cores; and
  transfer an output of the two or more subtasks to a network interface device of the multiple heterogeneous network interface devices based on the network interface to be used.

16. The system of claim 15, wherein:
the task analyzer unit is configured to select the allocation strategy for the communication task by reference to a table that stores a plurality of communication attributions and a plurality of allocation strategies, including the one-to-one allocation strategy, the one-to-many allocation strategy, the many-to-one allocation strategy, or the many-to-many allocation strategy.

* * * * *

UNITED STATES PATENT AND TRADEMARK OFFICE
CERTIFICATE OF CORRECTION

PATENT NO.        : 9,229,779 B2
APPLICATION NO.   : 12/647711
DATED             : January 5, 2016
INVENTOR(S)       : Kurabayashi et al.

Page 1 of 1

It is certified that error appears in the above-identified patent and that said Letters Patent is hereby corrected as shown below:

IN THE SPECIFICATION

In Column 9, Line 19, delete "NV ports" and insert -- A/V ports --, therefor.

Signed and Sealed this
Twelfth Day of April, 2016

Michelle K. Lee
*Director of the United States Patent and Trademark Office*